Figures 1, 2:
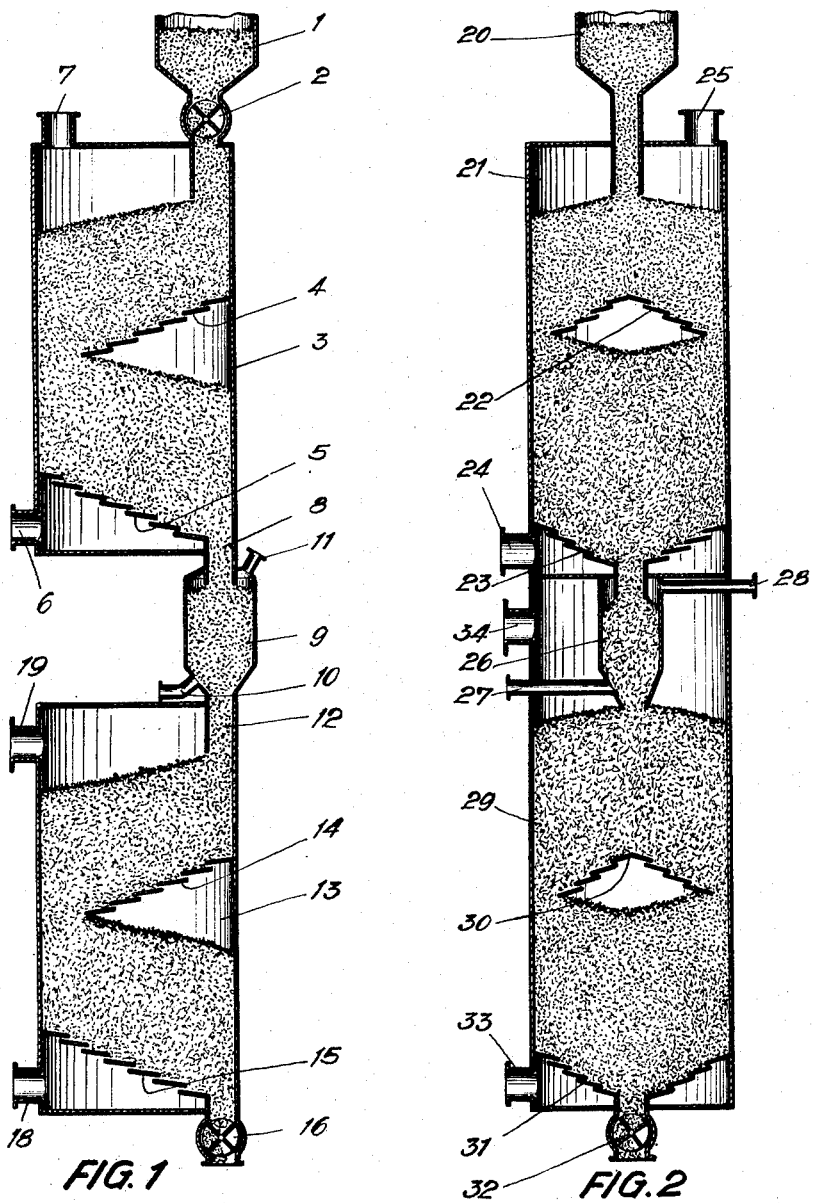

Dec. 24, 1957  F. SCHAUB  2,817,625
CATALYTIC SPLITTING OF HYDROCARBONS IN THE VAPOR PHASE
Filed Sept. 11, 1951

INVENTOR
Franz Schaub
BY Burgess + Dinklage
ATTORNEY:

United States Patent Office 2,817,625
Patented Dec. 24, 1957

2,817,625

CATALYTIC SPLITTING OF HYDROCARBONS IN THE VAPOR PHASE

Franz Schaub, Oberhausen-Holten, Germany, assignor to Ruhrchemie Aktiengesellschaft, Oberhausen-Holten, Germany, a German corporation Application September 11, 1951, Serial No. 246,051

Claims priority, application Germany September 22, 1950

5 Claims. (Cl. 196—52)

This invention relates to improvements in the catalytic splitting of hydrocarbons in the vapor phase.

It is well known to catalytically split hydrocarbons in the presence of a pulverulent catalyst. In this conventional process the hydrocarbon oil vapors are passed upward through a reaction chamber and passed through the pulverulent catalyst in this chamber. The upward velocity of the hydrocarbon oil vapors is such that the catalyst is carried off at the top of the reaction chamber and must be separated from the oil vapors. This separation of the pulverulent catalyst causes many difficulties and is usually effected by cyclone separators or the like.

In the new "fluidized" splitting process the velocity of the vaporized hydrocarbons is so regulated that a well defined boundary layer forms in the suspended whirling catalyst mass and only a small part of the pulverulent catalyst is carried upward and out of the reaction chamber while the larger portion is carried out at the bottom. During this fluidized process, however, the reaction chamber is only partly filled with the catalyst, so that comparatively large splitting installations are required. In addition, the pulverulent catalyst must be still in part separated from the vapor and the use of cyclone separators is still required.

Proposals have also been made to execute the catalytic splitting of hydrocarbons according to the "fluidized" process with the use of catalysts having the grain size of 0.5 to 3 millimeters. In this process the main mass of the catalyst grains fed in must remain suspended in the reaction chamber and must be carried off very slowly by the treated oil vapors. This results in a greater concentration of the catalyst in the reaction chamber, and thus a better splitting effect per unit of unit of reaction space. In this process, however, the smaller catalyst grains are mostly carried off upward. Besides, a partial formation of dust cannot be avoided. This finally results in such an irregular distribution of the catalyst that, especially the larger catalyst particles, remain in the reaction zone for too long a period of time. Furthermore, devices for the separation of the partly powdery and partly granular catalyst from the oil vapors are required.

These disadvantages of the "fluidized" splitting process are avoided by the use of the moving catalyst chute. In this process the granular catalyst is allowed to fall continuously from the top toward the bottom and it is carried off at the lower end of the splitting apparatus. The hydrocarbon vapors are usually moved in the same direction as the granular contact material, but it is also possible to move them countercurrent thereto. No dust is carried off with the hydrocarbon vapors. Since the catalyst fills the whole splitting chamber, a good utilization of the reaction space is assured. In the case of fairly large splitting chambers, however, it is difficult to obtain an entirely uniform passage of the catalyst through the chamber and a uniform distribution of the oil vapors over the catalyst mass. Attempts have been made to eliminate these difficulties by the installation of comparatively complicated devices. None of these attempts, however, have ever met with any real success.

One object of this invention is the catalytic splitting of hydrocarbons without the aforementioned difficulty. This, and still further objects will become apparent from the following description:

It has now been found that the catalytic splitting process can be carried out in a surprisingly simple manner with the uniform action of the gases and the catalyst if a catalyst having a granular size of 0.5 to 10 millimeters and preferably 0.5 to 3 millimeters is passed downwardly through a reaction zone over a supporting surface which will allow passage of vapors therethrough, and the vaporized hydrocarbons are blown in from the bottom upward through the reaction zone with a velocity great enough so that the downwardly passing catalyst granules will not exert any appreciable pressure on the supporting surface, but not great enough to cause eddying turbulence or whirling of the downwardly passing catalyst granules. The required velocity of the oil vapor depends on the specific gravity, the volume and the size of the catalyst granules and on the properties of the oil vapors under the reaction condition. This velocity can very easily be determined impirically for every splitting process.

The process according to the invention has the advantage that an extraordinarily uniform distribution of the oil vapors in the catalyst layer is obtained, and special installations for the improvement of the gas distribution within the splitting chambers are not required. The velocity of the oil vapors can be increased to such a degree that the lift of the catalyst granules due to the rising gas is about equal to the weight of the granules. In this way, the catalyst obtains a very good flow, so that its continuous flow is carried through easily and uniformly. The excellent catalyst flow obtained in this way permits the construction of relatively large splitting chambers. However, the velocity of the oil vapors must not be increased to such a degree that the catalyst mass is put into a strongly turbulent motion, but it must be sufficient to loosen the granular catalyst layer so that its good flow is assured. The steady flow motion of the catalyst through the reaction chamber, thus remains essentially constant, and there is only a small upper layer of slow moving granules which, however, do not change their position relative to the surrounding granules to any marked degree. Therefore a pulverization of the catalyst is practically avoided, and it is not necessary to free the treated oil vapors from the catalyst particles. The use of customary special devices for freeing the oil vapors from carried along catalyst particles is thus avoided.

The hydrocarbon vapors are conducted toward the descending catalyst suitably through the slits of a grate or between grid plates whose slope is adjustable to the feeding angle of the catalyst. In the case of round splitting chambers, it is suitable to carry the catalyst off through an opening in the center of the bottom of the splitting apparatus whose opening width is so adjusted that the catalyst layer within the splitting chamber remains as constant as possible. In rectangular splitting chambers, the catalyst mass is suitably carried out on the side. In the case of catalyst layers of greater height, the cross-section of the splitting chamber may be increased toward the top in order to produce greater oil vapor velocities in the lower catalyst layers than in the upper ones. In this way the greater pressure on the lower catalyst layers produced by the upper catalyst layers is largely reduced.

When the splitting process requires high catalyst layers, it is possible to work with several grates or grids, one above the other, over which the catalyst layers of small height slide down and through which the oil vapors pass successively. In this way the flow properties of the catalysts are considerably improved. The individual grate or grid surfaces must be so arranged that their slopes are adjusted to the surface of the catalyst layer as much as possible. For this purpose, for instance, the grates or grids may be arranged nearly horizontal, and the average slope of the total surface may be adjusted through a corresponding position of their front edges and the width of their slits. Such an arrangement of the grate or grid surfaces produces at the same time a good diffusion of the ascending oil vapors over the total cross-section of the catalyst mass.

By arranging the flow of the catalyst and the oil vapors in opposite directions, as provided for in the process according to the invention, it is possible to obtain any desired temperature gradient within the splitting processes, and thus a maximum utilization of the catalyst.

The catalyst which has become inactive through the separation of carbon in the splitting zone is regenerated with air or oxygenous gases after having been blown out previously with steam or inert gases. In this procedure, the catalyst may also flow downward, with the upward flowing gases causing a partial reduction of its pressure on the supporting surface. In this process air or oxygenous gases are blown in from the bottom with such velocity that the catalyst does not exert any appreciable pressure on its supporting surface, but without changing into a state of turbulence or eddying.

The process according to the invention can be carried out with all the conventionally used splitting catalysts, e. g., it is possible to use aluminum or magnesium hydrosilicates in the form of artificially produced masses or as natural bleaching clays activated with acids. The size of the granules may be 0.5 to 10 millimeters, preferably 0.5 to 3 millimeters. The hydrocarbon vapors, in this case, must have a velocity of 20 to 200 cm./sec. In many cases it is advantageous to carry out the splitting process in the presence of steam, hydrogen or other gases. The splitting temperatures and pressures depend on the starting material to be processed. Normal, increased or reduced pressures may be used. The splitting temperatures depend on the starting material and the end products desired. The splitting temperatures are usually between 420 and 550°. The starting materials may be vaporizable hydrocarbons of any kind, e. g. petroleum, hydrogenation products, or products of the catalytic hydrogenation of carbon monoxide.

The splitting catalysts used may contain additions of heavy metals or heavy metal compounds which have catalytic effects.

The process according to the invention may be carried out, for example, with the equipment represented in the drawing in the form of vertical longitudinal sections.

In the device shown in Figure 1, the catalyst is fed into a hopper 1 and, by means of a rotary pocket feeder 2, continuously or batchwise passed over into the splitting chamber 3. Inside the splitting chamber 3, two cascade-like grid plates 4 and 5 are installed over which the catalyst slides down.

The hydrocarbons to be split are fed, in the vaporized state and at a sufficient temperature and velocity, through a conduit 6 and carried off at the top of the container 3 through a conduit 7. The velocity of these gases is so great that the catalyst exerts practically no pressure on the grid surfaces 4 and 5, but without changing into the fluidized state.

At the bottom of container 3, the catalyst falls continuously into a container 9 through which, by means of conduit 10, inert gases are blown in which are led off through conduit 11.

The catalyst which, in container 9, has sufficiently been freed from combustible hydrocarbon gases passes through a channel 12 into the casing 13 where the burning out of the carbonaceous deposits and, if necessary, the completion of the regeneration take place. Here, the catalyst slides at first over a cascade-like grate or grid 14 and then downwardly over a cascade-like grate or grid 15. Oxygen-containing gases for the burning out of the carbonaceous deposits are blown in through opening 18. The gases formed in the burning out leave the container 13 through a tubular nozzle 19.

At the bottom of container 13 the catalyst is carried out by means of a rotary pocket discharger 16. If necessary, the catalyst is further treated and made up and then returned into the feed hopper 1.

The device schematically represented in Figure 2 operates in a similar manner.

The catalyst charged into hopper 2 passes at first through the splitting chamber 21, where it slides downwardly, at a suitable velocity, at first over a cone-shaped grate 22 and then over a hopper-shaped grate 23. The hydrocarbons to be split are blown in, in the vaporized state, through opening 24 at a velocity which must be sufficient high to considerably reduce the pressure exerted on the grate by the catalyst. The gaseous splitting products leave the splitting chamber 21 through an opening 25.

The catalyst loaded with carbonaceous deposits passes at first through degassing vessel 26 where, by means of inert gases entering through line 27 and leaving through line 28, still present residual hydrocarbons are blown off. Then the catalyst passes into burning chamber 29 where it slides at first over the cone-shaped grate 30 and then over the hopper-shaped grate 31.

At the lower end of chamber 29 the catalyst is carried out by means of a rotary pocket discharger 32. The hot gases required for burning out are led in at 33. The combustion products are carried off through a tubular nozzle 34. The catalyst discharged may be subjected to a further treatment in any way before returning into the feed hopper 20 in order to be used again in the splitting process.

The flow of catalyst is automatically adjusted by means of the speed of rotation of the rotary feeder 32. Due to both, the gaseous media blown into splitting chamber 21 and into burning chamber 29, the pressure exerted on the grid surfaces by the catalyst is reduced so far that the catalyst runs continuously downwardly, even when the slope of the grid surfaces is less than the angle of slope.

The following example is given to illustrate the invention and not limit the same, the invention being limited by the appended claims or their equivalents.

*Example*

A fraction obtained from catalytic carbon monoxide hydrogenation, boiling between 160° to 400°, was conducted at a velocity of 20 to 50 cm./sec. in a vaporized state at an average reaction temperature of 520° and atmospheric pressure, through a reaction chamber from the bottom to the top. During this procedure 0.15 kg. of starting material per liter of reaction space were put through every hour. Simultaneously with the hydrocarbon vapor, 0.15 kg. of steam per liter of reaction space were fed in every hour, having a temperature of 520° C. 0.8 kg. of acid-activated natural bleaching clay, having a granular size of 1 to 2 milliliters per liter of reaction space passed every hour through the splitting apparatus from the top to the bottom over grates arranged in the form of steps.

A splitting of 40% of the starting material put in was obtained. The products of the splitting process showed the following composition:

17% by weight benzene hydrocarbons (boiling up to 200°)
19% by weight $C_5$-fraction with an olefine content of 88%
26% by weight $C_4$-fraction with an olefine content of 90%
24% by weight $C_3$-fraction with an olefine content of 90%
14% by weight split gas, carbon and loss When the $C_3$–$C_5$ fractions were polymerized and the polymerization products obtained were added to the split benzene, the result was 80% by weight of the starting material in the form of a benzene which had a motor octane number of 88, without any addition of tetraethyl lead. Besides, 6% by weight of hydrocarbons were obtained which could be easily liquefied.

I claim:

1. Process for the catalytic splitting of hydrocarbons in the vapor phase which comprises establishing a substantially vertical splitting zone, passing catalysts having a granular size of 0.5 to 10 millimeters downward in the form of a contiguous non-turbulent body of appreciably layer height through said splitting zone on to and over at least two separate, downwardly inclined, supporting surfaces which will allow the passage of vapor therethrough, said downwardly inclined surfaces being positioned one above the other for the passage of said granular catalyst over the top surface and on to and over the next subsequent surfaces with each of said downwardly inclined surfaces extending over a major portion of the cross-section of said splitting zone, passing vaporized hydrocarbons upward through said splitting zone from the bottom thereof through said downwardly inclined supporting surfaces in contact with the body of said catalyst at a velocity sufficient to substantially reduce the pressure of the body of catalyst on said downwardly inclined surfaces and not cause turbulence of said body, and recovering split hydrocarbons from the top of said splitting zone.

2. Process according to claim 1, in which said catalyst has a grain size of about 0.5 to 3 millimeters.

3. Process according to claim 1, in which catalyst at least partially exhausted from passage through said splitting zone is regenerated by being passed downward through a regeneration zone over a supporting surface which will allow the passage of gas therethrough, and oxygen-containing gas is blown upward through said regeneration zone through the supporting surface in contact with the catalyst with a velocity sufficient to substantially reduce the pressure of the catalyst on the supporting surface and not cause turbulence thereof.

4. Process according to claim 3, in which said supporting surfaces are defined by multiple grid plates defining slits therebetween.

5. Process according to claim 1, in which said supporting surfaces are defined by multiple grid plates defining slits therebetween.

References Cited in the file of this patent

UNITED STATES PATENTS

| 2,239,801 | Voorhees | Apr. 29, 1941 |
| 2,389,493 | Evans | Nov. 20, 1945 |
| 2,410,309 | Simpson et al. | Oct. 29, 1946 |
| 2,444,128 | Anderson | June 29, 1948 |

FOREIGN PATENTS

| 364,762 | Great Britain | Jan. 14, 1932 |